Patented Apr. 30, 1940

2,199,201

UNITED STATES PATENT OFFICE 2,199,201

SOLUBLE EGG DYE

Folke Heden, Brooklyn, N. Y., assignor to Fred Fear & Co., Brooklyn, N. Y., a corporation of New York No Drawing. Application May 3, 1939, Serial No. 271,503

1 Claim. (Cl. 8—79)

This invention relates to improvements in water soluble dyes and the methods of producing them whereby they are readily available for easy use and are more efficient when used for their intended purposes.

A particular object of this invention is the preparation of water soluble dyes in a form in which they may be easily handled and prepared for use and when ready for use are of such characteristics that a more uniform color application is secured.

A more particular object of this invention is the preparation of water soluble dyes which in solution are particularly efficient in the coloring of eggs as used at Easter time in that a very uniform color application is secured even by those unfamiliar with the subject of dyeing and the finished product has a high gloss which is very desirable.

Another object of the invention is the preparation of a water soluble dye which in solution has an acid content which secures the above results by reason in part of the fact that some of the acids of the bath form an insoluble calcium compound depending upon the nature of the acids which are present, in the form of a coating on the egg, and which serves to absorb the color with uniformity and leave the colored surface highly glossed.

This as well as other objects, as will be apparent from the following description, are secured by means of the invention herein disclosed.

This invention resides substantially in the composition and methods of preparation as herein after fully disclosed.

Dyeing or coloring materials of the water soluble type which have heretofore been known for the purpose of imparting particular colors to an object and particularly to eggs, have all been subject to the difficulty that the user could not effect a uniform application of the color to the egg with certainty. This results particularly in view of the fact that most eggs do not present a uniform surface, condition, composition and structure.

It has been discovered that in dyeing or coloring eggs with water soluble dyes a uniform application of the color can be more readily obtained by employing a dye bath having a definite pH value, that is a hydrogen ion concentration in a particular range.

In the application of this principle to the dyeing or coloring of eggs, it has been found further that if suitable acids, such as sulphuric acid and phosphoric acid in the proper concentrations, are employed in the bath, an insoluble calcium compound (sulphate or phosphate) forms on the eggshell, providing a layer which in addition to readily accepting the dye with a uniform coloring effect all over, results in a dyed egg which has a high gloss. This is desirable because of the pleasing appearance which it presents.

Dyes or coloring materials which are water soluble are prepared in a water solution of a suitable color concentration and there is added thereto, in addition to the above mentioned acids, a sufficient quantity of a weak (organic) acid, such as tartaric acetic and citric acids, plus the sodium or potassium salts of these acids, so that when the dye material is redissolved, as will be explained later, the bath will contain a buffer solution of a weak acid together with one of its salts, thus assuring the maintenance of a proper pH value in the bath. The pH value is within the range of two to four depending on the particular dye used.

Should the solvent, which is water, vary in mineral content and hydrogen ion concentration, as is usually the case in different localities, the fact that the dye bath contains a buffer solution, which will maintain a proper pH in spite of these variations in the water, will permit the proper application of the dye to the surface of the egg.

The concentrated solution as thus prepared is preferably put in a more suitable form for sale and distribution than solution form. The concentrated dye or coloring solution may therefore be dried to form a powder, and packaged as such, formed into pellets, or used to impregnate any suitable form of absorbent carrier, which is then dried. As one example, the carrier may be a properly prepared paper of the types disclosed in the United States Patent to Fred Fear, No. 1,279,679, dated September 24, 1918.

At the time of use a sufficient quantity of the powder, a pellet, or a piece of the impregnated paper, is immersed in water, preferably warm water, so that the powder or pellet dissolves thereinto or the dye or coloring material on the impregnated paper bleeds thereinto. When properly prepared the dye bath resulting will have a pH value within the range above mentioned.

When an object to be dyed is immersed therein, the dye or coloring material is more uniformly applied thereto with greater certainty, even in the hands of unskilled persons, because of the favorable acidity of the bath. In the particular case of eggs, the sulphuric acid or phosphoric acid of the bath reacts with the calcium carbonate of the shell forming a coating of an insoluble calcium salt. This coating tends to quickly accept the dye uniformly throughout and when the egg is dry it has the desired high gloss.

It is, of course, understood that the acids used, such as sulphuric or phosphoric acid, will diminish in quantity every time an egg is dyed in the bath. However, the quantities of these acids required for each individual egg are so small and the solution is so well buffered that the pH value will remain within the range specified above.

When the dye bath contains sulphuric acid the eggshell coating comprises calcium sulphate. When phosphoric acid is used the resulting coating is calcium phosphate. It is believed that the insoluble calcium salts of these acids remain on the surface of the egg in the form of a coating which at one and the same time accepts the dye uniformly and leaves the egg with a high gloss.

From a broader viewpoint, the dye bath includes therein a strongly dissociated acid capable of forming an insoluble calcium salt on reaction with the calcium carbonate of the eggshell, and a weakly dissociated acid which has a buffering action. In order to insure this buffering action with absolute certainty a sodium or potassium salt of the weakly dissociated acid is preferably although not necessarily employed.

From the above description it will be apparent to those skilled in the art that this invention may be varied without departure from the novel scope of the subject matter thereof. I do not, therefore, desire to be strictly limited to the disclosure as given for purposes of illustration, but rather to the scope of the claim granted me.

What I claim is:

An article of the type described for preparing an egg dye bath comprising a dry absorbent carrier having incorporated therein a water soluble dye and a quantity of phosphoric acid and a weakly dissociated acid which will maintain a dye bath at a pH value of from two to four when immersed in a suitable quantity of water.

FOLKE HEDEN.